United States Patent
Shattil

(10) Patent No.: US 7,391,804 B2
(45) Date of Patent: Jun. 24, 2008

(54) SPREAD SPECTRUM COMMUNICATION METHOD AND SYSTEM USING DIVERSITY CORRELATION AND MULTI-USER DETECTION

(75) Inventor: Steve J. Shattil, Boulder, CO (US)

(73) Assignee: Lot 41 Acquisition Foundation, LLC, Wilmington, DE (US)

( * ) Notice: Subject to any disclaimer, the term of this patent is extended or adjusted under 35 U.S.C. 154(b) by 846 days.

(21) Appl. No.: 09/824,264

(22) Filed: Apr. 2, 2001

(65) Prior Publication Data

US 2001/0046255 A1    Nov. 29, 2001

Related U.S. Application Data

(60) Provisional application No. 60/194,633, filed on Apr. 4, 2000.

(51) Int. Cl.
  *H04B 1/707* (2006.01)
  *H04B 1/69* (2006.01)
(52) U.S. Cl. ......................... 375/146; 375/140
(58) Field of Classification Search .............. 375/130, 375/267, 299, 146, 140, 141, 147; 455/103, 455/105
See application file for complete search history.

(56) References Cited

U.S. PATENT DOCUMENTS

| 5,289,499 | A | * | 2/1994 | Weerackody | 375/146 |
|---|---|---|---|---|---|
| 5,781,845 | A | * | 7/1998 | Dybdal et al. | 455/103 |
| 5,809,060 | A | * | 9/1998 | Cafarella et al. | 375/146 |
| 6,252,864 | B1 | * | 6/2001 | Hayashi | 370/335 |
| 6,317,411 | B1 | * | 11/2001 | Whinnett et al. | 375/267 |
| 6,831,943 | B1 | * | 12/2004 | Dabak et al. | 375/147 |

* cited by examiner

*Primary Examiner*—Betsy L. Deppe
(74) *Attorney, Agent, or Firm*—Connolly Bove Lodge & Hutz LLP

(57) ABSTRACT

A communication system transmits and receives a plurality of spread-spectrum signals having differences in at least one diversity parameter. The signals are highly correlated when their diversity parameters are similar, and the signals are uncorrelated when at least one diversity parameter is different. Any combination of a transmitter, a receiver, and a communication channel may diversity-encode the signals to effect differences in their diversity parameters. A receiver diversity-decoder compensates for differences in a diversity-parameter of at least one received signal to make the signal highly correlated with at least one other received signal. A correlator combines at least two of the received signals to recover an embedded information signal. The communication system enables the use of true-noise signals for spreading information signals, provides simplified receiver designs, and enables antenna arrays to spatially process spread-spectrum signals.

11 Claims, 9 Drawing Sheets

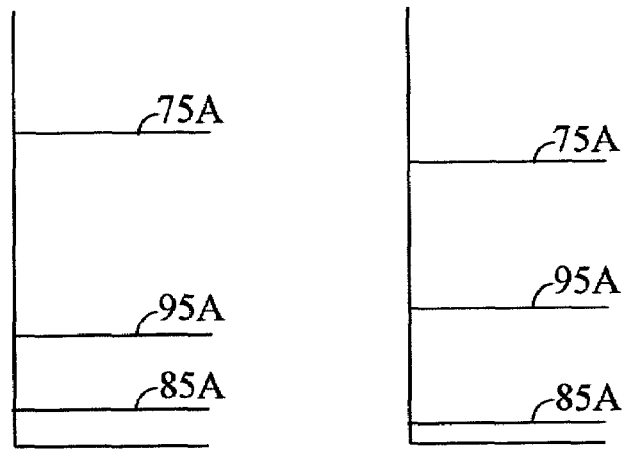
FIG. 7A  FIG. 7B
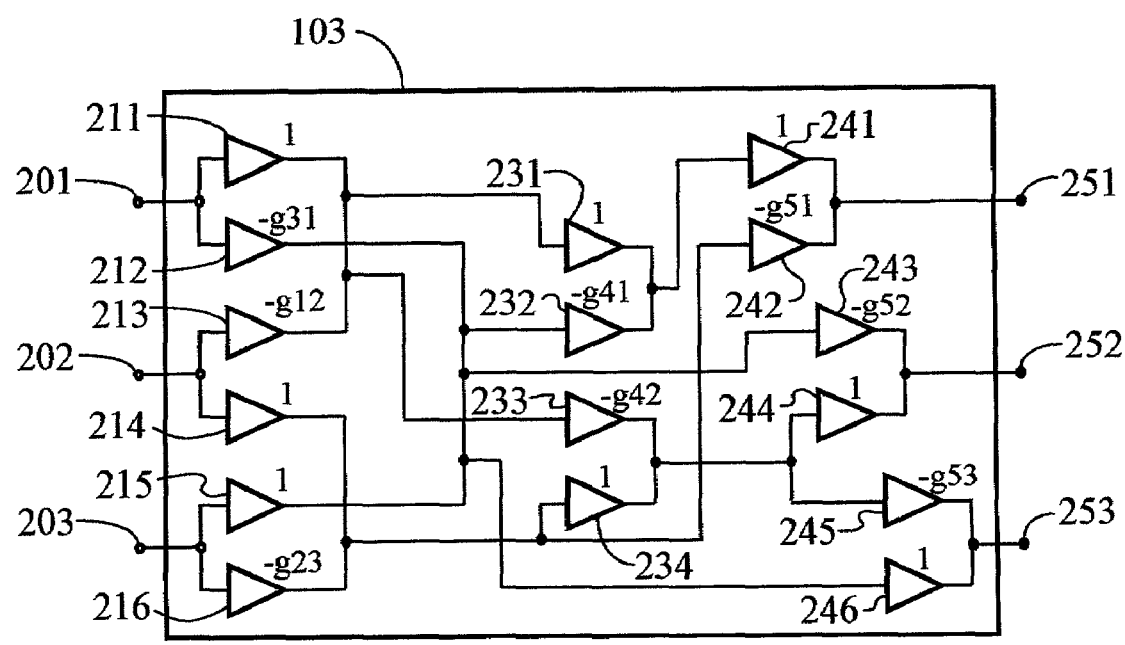
FIG. 8

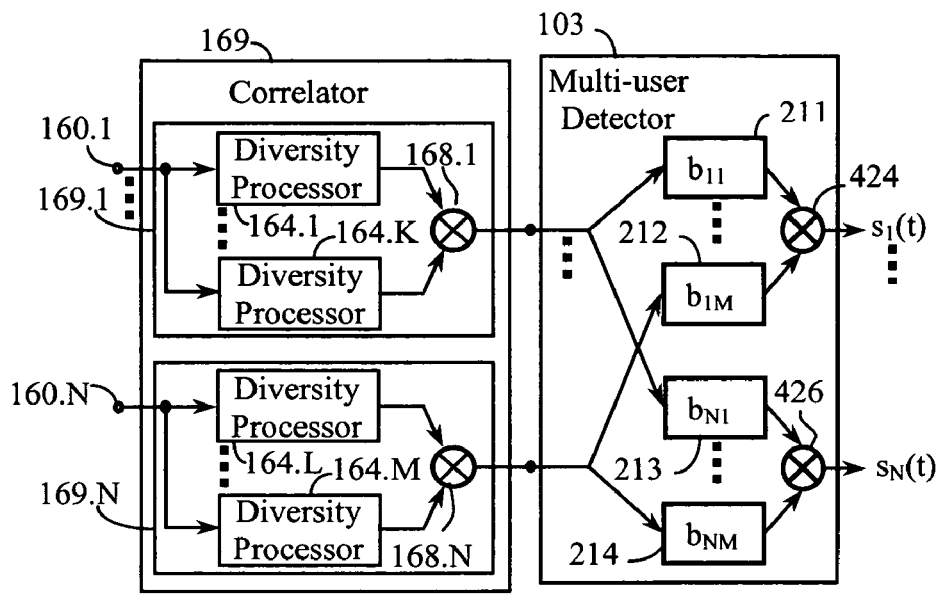
FIG. 11
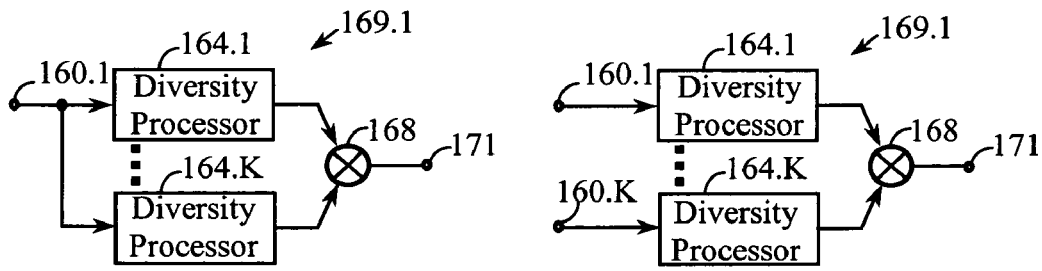
FIG. 12A  FIG. 12B
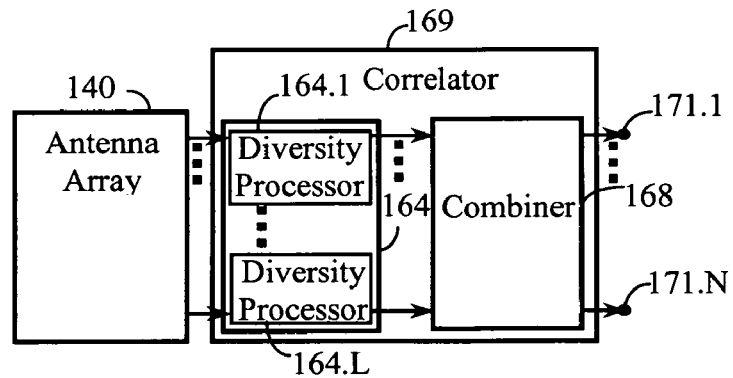
FIG. 13

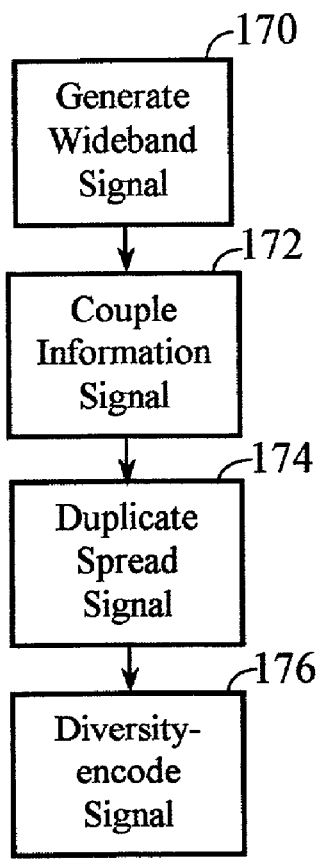
FIG. 14A
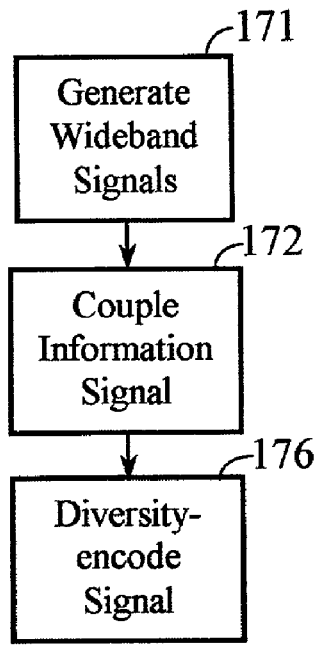
FIG. 14B
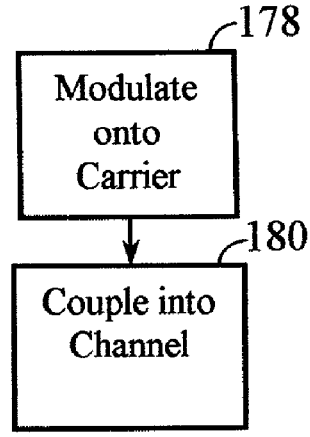
FIG. 14C
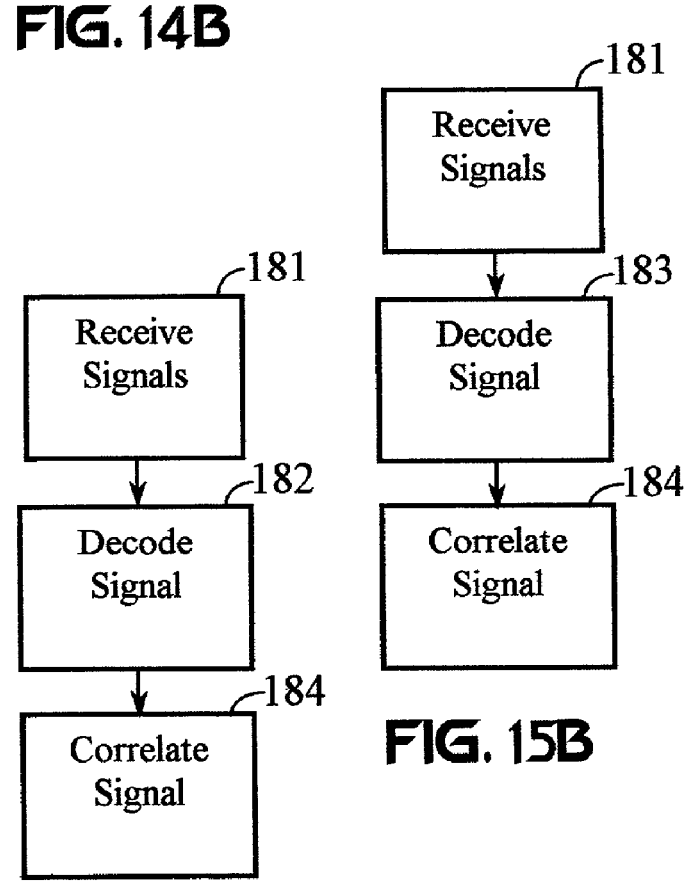
FIG. 15A
FIG. 15B

SPREAD SPECTRUM COMMUNICATION METHOD AND SYSTEM USING DIVERSITY CORRELATION AND MULTI-USER DETECTION

This application claims the benefit of U.S. provisional application Ser. No. 60/194,633, Filed Apr. 4, 2000.

FIELD OF THE INVENTION

The present invention relates to spread-spectrum communication and radar systems. More specifically, the present invention relates to a spread-spectrum communication system that uses a diversity-processing system, such as an antenna array.

BACKGROUND OF THE INVENTION

In a spread-spectrum communication system, the transmitted signal bandwidth is much greater than the bandwidth or rate of information being sent. Also, some function other than the information being sent is employed to provide the resulting modulated radio-frequency (RF) bandwidth.

The desired signal is recovered by remapping the expanded-bandwidth signal into the original information bandwidth. In direct sequence CDMA (DS-CDMA) systems, removal or demodulation of the spectrum-spreading modulation is accomplished by multiplication with a local reference identical in structure and synchronized in time with the received signal. Correlation is a method of time-domain analysis that is particularly useful for detecting signals buried in noise, establishing coherence between random signals, and determining the sources of signals and their transmission times. In DS-CDMA systems, the prime purpose of a correlator is to match the local reference signal to a desired incoming signal and thereby reproduce the embedded information-bearing carrier as an output.

Frequency reuse is the process of using the same frequency in multiple separate geographic regions for a plurality of distinct communication links. Frequencies can be reused provided that the regions are attenuated or isolated from each other by a minimum value for signal rejection by user receivers in each region. U.S. Pat. No. 4,901,307 describes the process of creating marginal isolation, which provides an increase in frequency reuse in DS-CDMA systems. In DS-CDMA, even small reductions in the overall power level of the system allow for increased system capacity. One particularly effective method for creating isolation and improving frequency reuse is spatial division multiple access (SDMA). SDMA applications to multiple access communication systems including adaptive array processing are discussed in U.S. Pat. No. 5,642,353, U.S. Pat. No. 5,592,490, U.S. Pat. No. 5,515,378, and U.S. Pat. No. 5,471,647. In addition to frequency reuse, antenna arrays also increase processing gain and improve interference rejection.

The advantage of using adaptive antenna arrays for DS-CDMA communications is that adaptive antenna arrays could provide significant improvements in range extension, interference reduction, and capacity increase. To identify a particular user, a DS-CDMA system demodulates Walsh codes after converting the received signal from RF to digital. Therefore, an adaptive antenna array requires information about the user codes from CDMA radio, or it needs to demodulate many different incoming RF signals to track mobile users. These methods are complex processes and are more difficult to implement than tracking users in non-CDMA systems. Major changes in CDMA radio architecture are required to implement adaptive array processing. These changes may be the major obstacle for adaptive array deployment in the near future.

Phased-array antenna systems employ a plurality of individual antennas or subarrays of antennas that are separately excited to cumulatively produce a highly directional electromagnetic wave. The radiated energy from each antenna element or subarray has a different phase so that an equiphase beam front (the cumulative wave front of electromagnetic energy radiated from all of the antenna elements in the array) travels in a selected direction. The difference in phase or timing between the antenna's activating signals determines the direction in which the cumulative wave front from all of the individual antenna elements is transmitted. Similarly, phase analysis of received electromagnetic energy detected by the individual array elements enables determination of the direction from which received signals arrive.

Beamforming, which is the adjustment of the relative phase of the actuating signals for the individual antennas, can be accomplished by electronically shifting the phases of the actuating signals. Beamforming can also be performed by introducing a time delay in the different actuating signals to sequentially excite the antenna elements that generate the desired transmission direction. However, phase-based electronically controlled phased-array systems are relatively large, heavy, complex, and expensive. These electronic systems require a large number of microwave components (such as phase shifters, power splitters, and waveguides) to form the antenna control system. This arrangement results in a system that is relatively lossy, electromagnetically sensitive, hardware-intensive, and has a narrow tunable bandwidth.

SUMMARY OF THE INVENTION

It is the principle objective of the present invention to provide a novel and improved method and apparatus for processing spread-spectrum signals received by an antenna array. The foregoing is accomplished by using diversity parameters (such as directionality, time, polarization, frequency, mode, spatial subchannels, and phase space) to correlate a plurality of desired signals and decorrelate interfering signals received by the array.

Diversity parameters of received signals can be adjusted by either or both the transmitters and the receivers. This ensures separability of interfering signals and enables optimization of the correlation process. A related objective of the invention is to optimize the correlation process by adjusting either or both the receivers and the transmitters.

Correlation processing at antenna arrays allows a small number of antenna elements to separate a large number of unknown signals. Long Baseline Interferometry may be used to increase the number of resolvable signals that can be processed by the array. Consequently, an objective of the invention is to reduce the number of antenna elements needed for array processing of spread-spectrum signals.

A communication channel may be used to adjust diversity parameters of the transmitted signals. Thus, another objective of the invention is to exploit distortion (such as multipath effects) in a communication channel to enhance signal quality and increase system capacity for spread-spectrum communications. Different communication channels, including communication channels associated with co-located transceivers, can provide distinct variations to diversity parameters of transmitted signals. For example, signals may change with respect to polarization, delay spread, spatial gain distribution, directional gain distribution, frequency-dependent gain distribution, mode distribution, phase space, etc. These variations can be used as unique signatures to identify signals received from different transmitters. There are many preferred methods, including correlation, that may be used to separate signals transmitted by different transmitters.

The correlation process may be combined with multi-user detection that removes interference and noise in a spread-spectrum receiver. Multi-user detection includes cancellation and constellation techniques that provide multiple algebraically unique combinations of unknown signals (including desired signals, interference, and noise). The objective of multi-user detection is to separate interfering signals in order to optimize signal-to-noise, signal-to-interference, or signal-to-noise-plus-interference ratios. Thus, an objective of the invention is to improve frequency reuse in a spread-spectrum communication system.

Further objectives of the invention include using true noise sources to encode information signals in a spread-spectrum communication system and simplifying receiver designs. An additional objective is to provide a bandwidth-efficient means of transmitting a decoding signal along with an information-modulated spread spectrum signal. This objective serves to simplify the receiver design, enable the transmitter to use spreading codes and noise-like signals that do not need to be duplicated by the receiver, and overlay a decoding signal in the same frequency band as its associated coded information signal.

The objectives of the present invention recited above, as well as additional objects, are apparent in the description of the preferred embodiments.

BRIEF DESCRIPTION OF THE DRAWINGS

FIG. 7A shows signal levels and noise levels measured at the output of a correlator having a first time offset.

FIG. 7A is a plot of signal levels and noise levels measured at the output of a correlator having a second time offset.

FIG. 8 is a process diagram that shows the operation of a three-input weight-and-sum canceller used for multi-user detection.

FIG. 11 shows a receiver having a correlation system and a multi-user detector.

FIG. 12A shows a single-input correlator that includes at least one diversity processor.

FIG. 12B shows a multiple-input correlator that includes at least one diversity processor.

FIG. 13 shows a spread-spectrum receiver of the present invention that includes a correlator processor.

FIG. 14A is a process diagram of a transmission method of the invention.

FIG. 14B shows steps of an alternative transmission method of the invention.

FIG. 14C is a process diagram of steps that may follow the transmission methods shown in FIG. 14A and FIG. 14B.

FIG. 15A shows steps of a process diagram for receiving spread-spectrum signals.

FIG. 15B is a process diagram for an alternative reception technique.

DETAILED DESCRIPTION OF PREFERRED EMBODIMENTS

Figure 1:
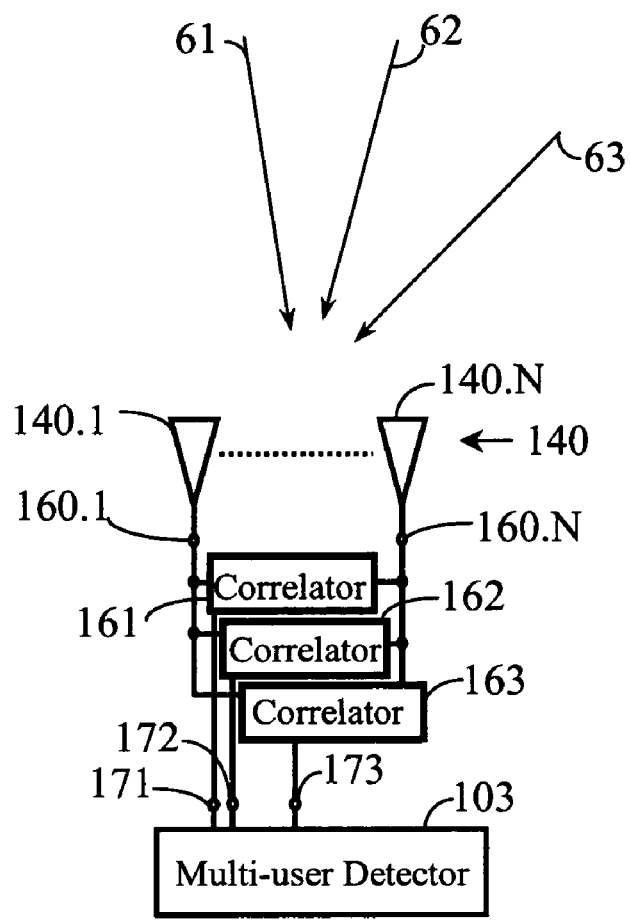
FIG. 1 shows a spread-spectrum receiver system of the present invention that uses an antenna array and a correlator to decode received spread-spectrum signals.

FIG. 1 shows a spread-spectrum receiver system of the present invention. An array 140 including at least two receivers 140.1 and 140.N receives a plurality of signals $s_n(t)$ from a plurality of directions of arrival, such as directions 61, 62, and 63, in a communication channel (not shown). Different directions (such as directions 61, 62, and 63) of arrival result in a plurality of different signal delays $\Delta t_i$ occurring between signals received by the two receivers 140.1 and 140.N. Signal responses of the receivers 140.1 and 140.N are output at one or more receiver outputs, such as outputs 160.1 and 160.N. The receiver-output signals are coupled into a plurality of correlators 161, 162, and 163. The output of each correlator 161, 162, and 163 is coupled to a multi-user detector 103.

Three transmitted signals $s_1(t)$, $s_2(t)$, and $s_3(t)$ arrive at the array 140 from the directions 61, 62, and 63, respectively. This simple case is shown for the purpose of facilitating an understanding of the function of the spread-spectrum receiver array. It will be appreciated that this understanding may be extended to more complex cases involving multipath components, distortions, noise, and large numbers of desired and/or interfering signals. The signals $s_1(t)$, $s_2(t)$, and $s_3(t)$ are assumed to be spread-spectrum signals, defined herein to mean any signal having a processing gain that exceeds one. It is preferable that the signals $s_1(t)$, $s_2(t)$, and $s_3(t)$ have high autocorrelation-to-cross correlation ratios (i.e., the signals are highly correlated with synchronized versions of themselves and substantially uncorrelated with other signals). It is preferable that the signals $s_1(t)$, $s_2(t)$, and $s_3(t)$ be substantially uncorrelated with unsynchronized versions of themselves.

The angle of arrival 61, 62, and 63 of each signal $s_1(t)$, $s_2(t)$, and $s_3(t)$, respectively, and the separation between the receivers 140.1 and 140.N determines the relative delay $\Delta t_i$ of the signals entering the correlators 161, 162, and 163. If the relative delay $\Delta t_i$ between samples of a particular signal $s_n(t)$ is less than the inverse of the signal bandwidth, the samples of the signal $s_n(t)$ from each receiver 140.1 and 140.N will be correlated. Additional delays may be provided by either or both receivers 140.1 and 140.N, or by the correlators 161, 162, and/or 163 to adjust the correlations of the received signals.

Figure 2:
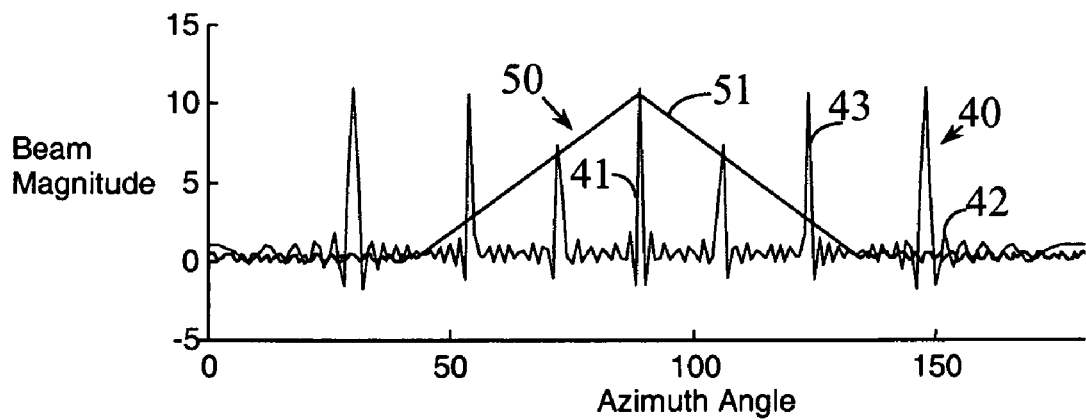
FIG. 2 is a plot of a carrier beam pattern and a correlation beam pattern of a receiver array.

FIG. 2 shows a carrier beam pattern 40 and a correlation beam pattern 50 of an array 140 of receivers (or transmitters). The beam patterns 40 and 50 represent reception sensitivity or transmission-signal magnitude with respect to angular direction relative to the array 140. The carrier beam pattern 40 has a main beam 41, a plurality of sidelobes (such as sidelobe 42), and possibly, secondary main lobes (such as secondary main lobe 43). The correlation beam pattern 50 has a main beam 51 resulting from a correlation peak. The correlation beam pattern 50 does not have sidelobes, but it may have minor correlation peaks (not shown).

Carrier beam patterns are well known in the prior art. The main beam 41 results from a coherent combining of signals received by receivers in the array 140. Sidelobes result from minor coherencies between received signals. Secondary main lobes (such as secondary main lobe 43) can result from a coherent combining of received signals from array elements that are separated by a large distance.

Correlation beam patterns (such as beam pattern 50) result from variations of relative delay with respect to angle of arrival and/or angle of transmission. Ideally, the correlation beam pattern 50 will not have secondary main lobes for a particular spread-spectrum signal $s_n(t)$ no matter how far the receivers are separated because the signal $s_n(t)$ is uncorrelated for relative delay magnitudes in excess of the signal's $s_n(t)$ inverse bandwidth.

The main-beam width of the correlation beam pattern 50 is much larger than the main-beam width of the carrier beam pattern 40 shown in FIG. 2 because the carrier frequency is typically much larger than the signal bandwidth. Reducing the beam width of the correlation beam pattern 50 can be done by increasing the signal $s_n(t)$ bandwidth or by increasing the separation between receivers in the array 140. Methods of Long Baseline Interferometry (LBI) or Very Long Baseline Interferometry (VLBI) are appropriate methods for carrying out methods of the present invention.

In some cases, it may be advantageous to remove the carriers from each received signal before correlation. Removing the carriers or otherwise compensating for the carrier beam pattern can reduce the effect that coherencies between the carriers may have on correlation.

Figure 3A:
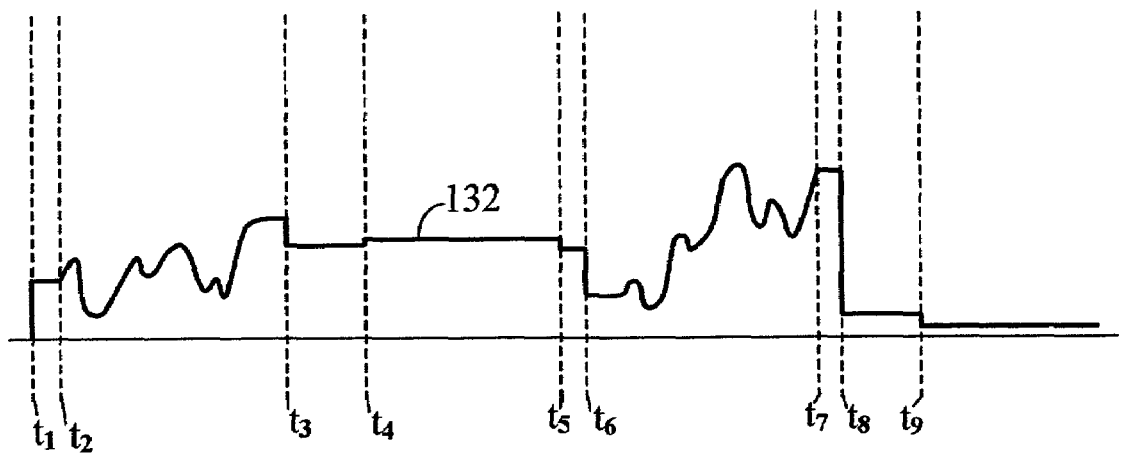
FIG. 3A is a plot of an amplitude-versus-time profile of a narrowband signal arriving at a receiver in a multipath environment.
Figure 3B:
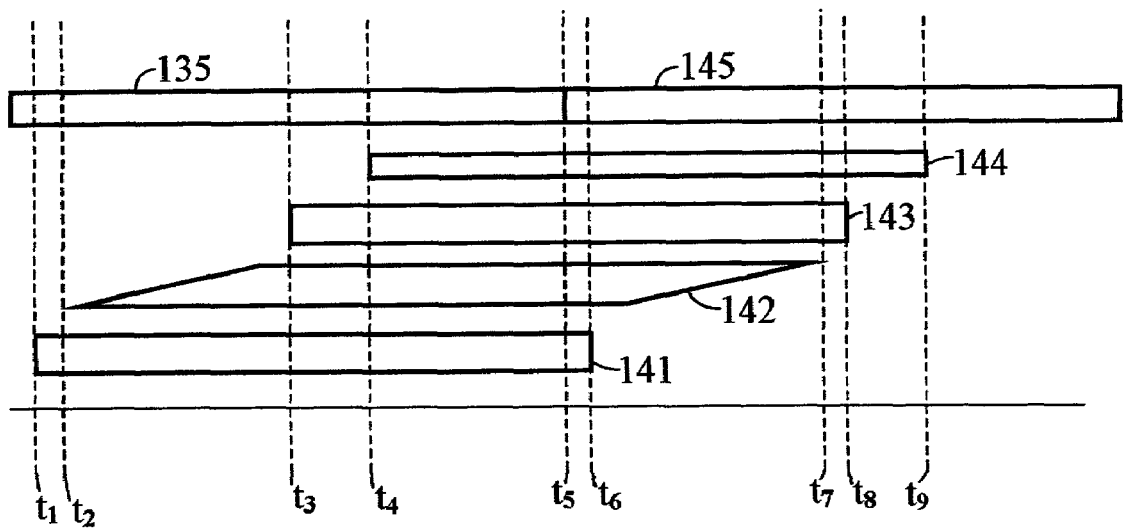
FIG. 3B is a plot of a delay profile of a signal arriving at a receiver in a multipath environment.

FIG. 3A shows an amplitude-versus-time profile 132 of a narrowband component of a signal $s_n(t)$ arriving at a receiver (not shown). In a multipath environment, a narrowband signal's intensity changes with respect to time due to flat fading. Delays between multipath components may be determined by processing one or more narrowband components. Simple amplitude-versus-time analysis may be used over one or more narrowband components, or over a wideband signal. A Fourier-type of analysis may also be used to determine a delay profile, such as the delay profile shown in FIG. 3B.

Figure 4A:
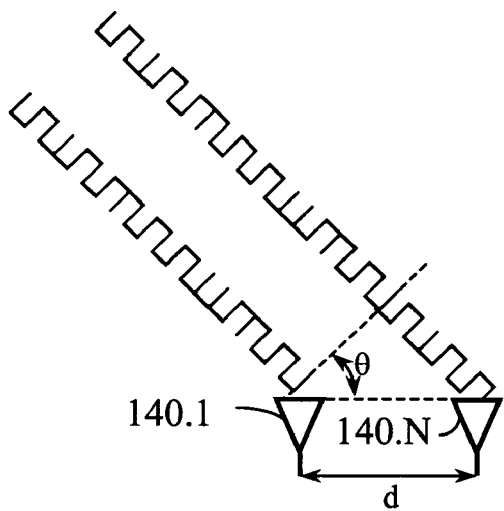
FIG. 4A shows two decorrelated direct-sequence signals arriving from an angle $\theta_i$ relative to an array having two spatially separated receivers.

FIG. 4A shows a direct-sequence signal $s_n(t)$ arriving at an angle $\theta_i$ relative to an array 140 having two receivers 140.1 and 140.N separated by a distance d. The path-length difference between the signal $s_n(t)$ arriving at each of the receivers 140.1 and 140.N is $D_i = d \sin \theta_i$. The relative delay is $\Delta t_i = D_i/c$, where c is the speed of electromagnetic radiation in the medium in which the array 140 is located. In this case, the delay $\Delta t_i$ exceeds the chip rate of the direct-sequence code in signal $s_n(t)$. Thus an applied delay of $\Delta t_i$ (which may be achieved by an additional effective path length $D_i$) applied at receiver 140.1 will enable correlation of the signal $s_n(t)$ received by the receivers 140.1 and 140.N. It will be appreciated that information may be modulated onto one or more of the received direct-sequence signal $s_n(t)$.

Figure 4B:
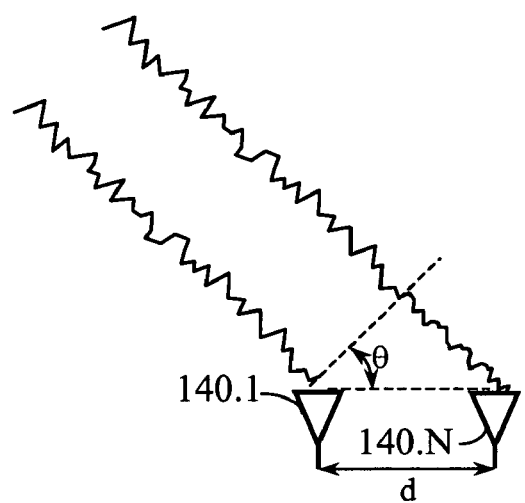
FIG. 4B shows two decorrelated noise signals arriving from an angle $\theta_i$ relative to an array having two spatially separated receivers.

FIG. 4B shows a noise signal $s_n(t)$ arriving from an angle $\theta_i$ relative to an array 140 having two receivers 140.1 and 140.N separated by a distance d. The processing method used for compensating for a relative delay $\Delta t_i$ between signals received by the receivers 140.1 and 140.N is identical to the method described with respect to FIG. 4A. If the relative delay $\Delta t_i$ is greater than the inverse of the bandwidth of the noise signal, the received samples of the signal $s_n(t)$ will be uncorrelated. It will be appreciated that an information signal may be impressed onto one or more of the noise signals $s_n(t)$.

A notable characteristic of the receiver shown in FIG. 1 is that it may use only two elements to separate three received signals $s_1(t)$, $s_2(t)$, and $s_3(t)$. The number of separable signals can be larger (in fact, much larger) than the number of receiving elements because each correlator 161, 162, and 163 is capable of generating an algebraically unique combination of received signals. In fact, any non-linear process may be used to generate an algebraically unique combination of received signals. In the present case, the signals $s_1(t)$, $s_2(t)$, and $s_3(t)$ are separable because different relative delays $\Delta t_i$ are used to characterize each signal $s_n(t)$. These relative delays $\Delta t_i$ are associated with different angles of arrival (such as 61, 62, and 63 shown in FIG. 1). The relative delays $\Delta t_i$ may be associated with multipath phenomena that cause multiple reflections of a given signal $s_n(t)$ to arrive at a receiver at different times. Thus, a single receiver element may be used instead of a receiver array to separate multiple received signals and/or remove interference (and/or noise) from at least one desired signal $s_n(t)$.

Figure 5A:
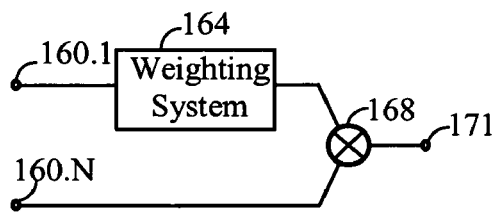
FIG. 5A is a functional diagram of a multi-input correlator system of the present invention.
Figure 5B:
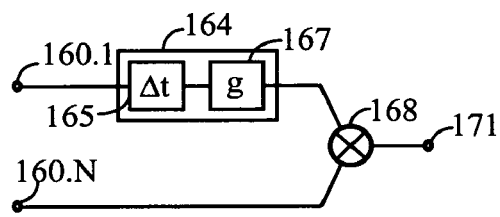
FIG. 5B is a functional diagram of a multi-input correlator system of the present invention.

FIG. 5A is a functional diagram of a correlator system (such as correlators 161, 162, and/or 163) that may be used in the receiver shown in FIG. 1. Correlator inputs are coupled to the receiver outputs 160.1 and 160.N. A weighting system 164 is capable of applying a complex weight to signals received from a receiver output, such as receiver output 160.1. One possible implementation of the weighting system 164 is shown in a functional diagram of a correlator depicted in FIG. 5B. The weighting system 164 may include a delay device 165 that is capable of providing at least one relative delay $\Delta t_i$ between signals received from the receiver outputs 160.1 and 160.N. A gain controller 167 is capable of providing amplitude adjustment to at least one delay-adjusted signal. The order in which the gain controller 167 and the delay device 165 are placed may be reversed. A plurality of samples, some of which may be delayed and/or gain adjusted, are combined in a signal combiner 168 capable of correlating the input samples and providing an output signal to an output 171.

The combiner 168 may also be referred to as a correlator. A combiner, such as the combiner 168, may provide any of a set of combining functions including, but not limited to, multiplication, summation, sampling, sampling and combining, convolution, integration, averaging, and transformation relative to any invertable transform function.

FIGS. 5C through 5F show additional correlator designs. Single-input correlators may be coupled to a single receiver output (such as receiver output 160.1), or to multiple receiver outputs (such as receiver outputs 160.1 to 160.N). Each of a pair of signal samples may be delayed by a different value of delay $\Delta t_i$ before correlation. Different delays $\Delta t_i$ may be used to obtain multiple correlations of one or more signals. Different delays $\Delta t_i$ may also be used to obtain different signals having optimum correlation at particular delays $\Delta t_j$. Correlation may include multiplying or otherwise combining more than two signal samples.

Figure 6:
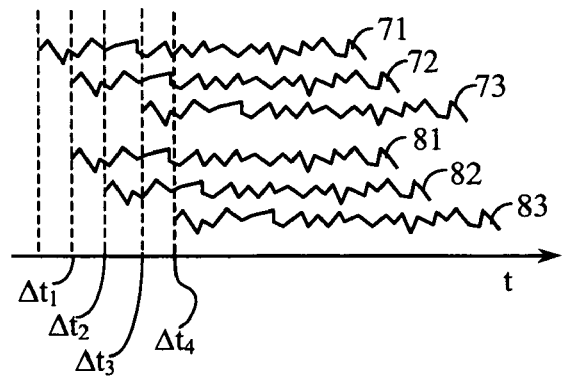
FIG. 6 shows a relative time-domain representation of two time-offset signal samples that each includes a plurality of multipath components of a spread-spectrum signal.
Figure 5C:
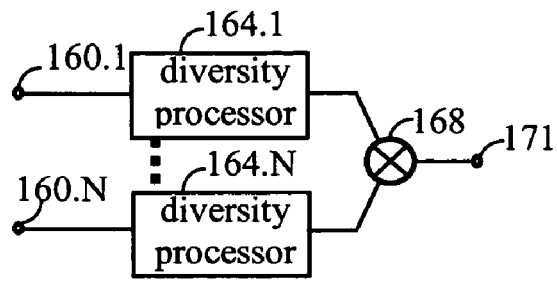
FIG. 5C is a functional diagram of a multi-input correlator system of the present invention.
Figure 5D:
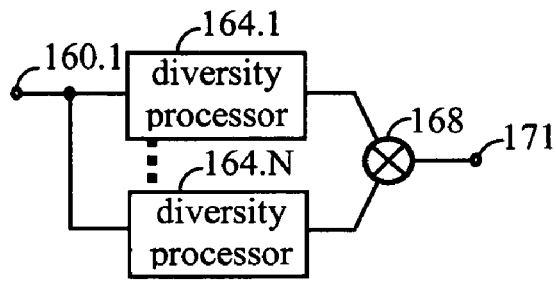
FIG. 5D is a functional diagram of a single-input correlator system of the present invention.
Figure 5E:
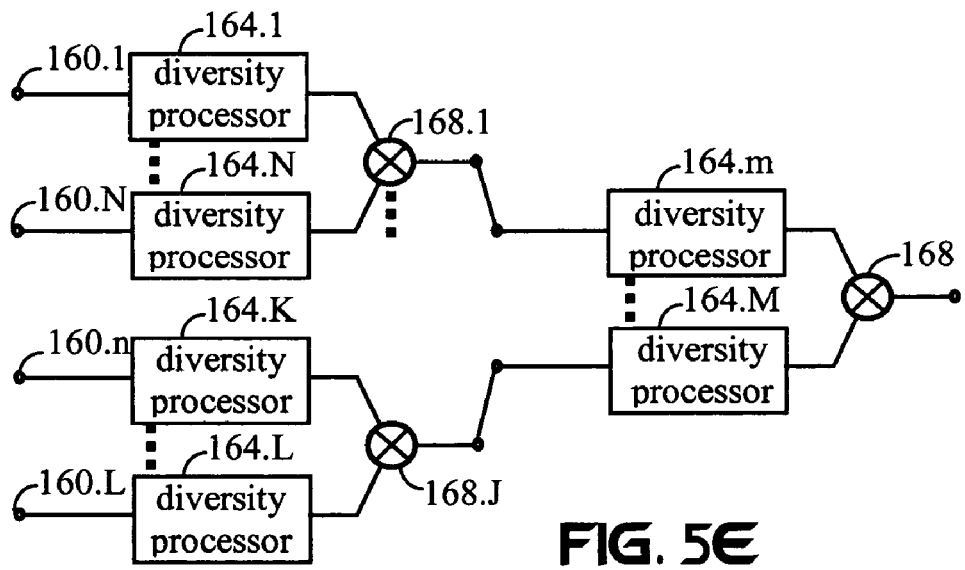
FIG. 5E is a functional diagram of a multi-input correlator system of the present invention.
Figure 5F:
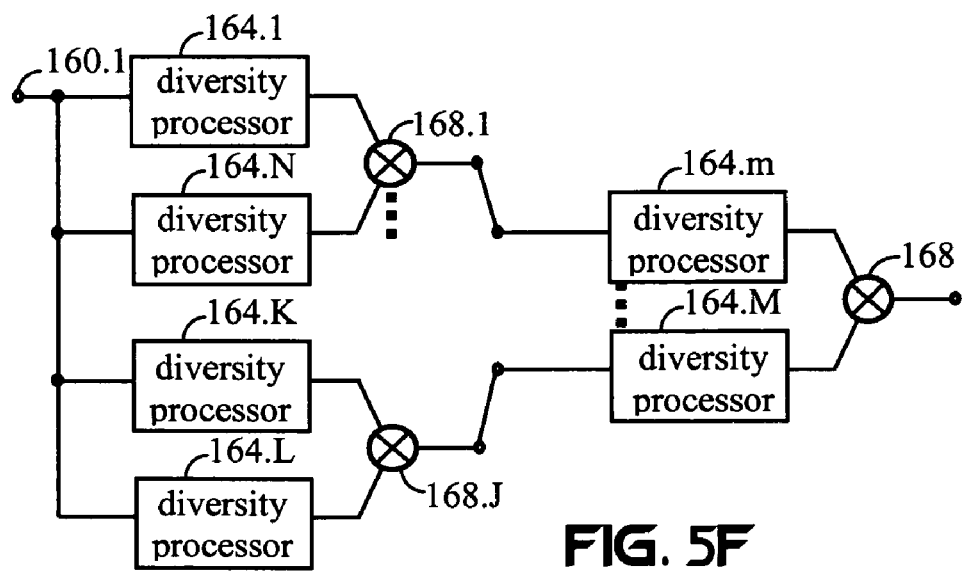
FIG. 5F is a functional diagram of a single-input correlator system of the present invention.

FIG. 6 shows a relative time-domain representation of two samples of a received signal $s_n(t)$ and its multipath components. Two samples are obtained for three delayed versions of a received signal $s_n(t)$. A first sample of received signals includes three multipath components 71, 72, and 73. Components 72 and 73 have relative delays of $\Delta t_1$ and $\Delta t_3$, respectively. A second sample of received signals also includes three multipath components 81, 82, and 83. Components 82 and 83 also have relative delays of $\Delta t_2 - \Delta t_1 = \Delta t_1$ and $\Delta t_4 - \Delta t_1 = \Delta t_3$, respectively. The samples may be taken from separate receivers or one or more samples may be split (or otherwise replicated) from the first sample taken from a receiver.

The second sample is time-shifted by an amount of $\Delta t_1$ so that component 72 lines up with component 81. This will cause components 72 and 81 to be correlated, whereas the other components will all be substantially uncorrelated.

The output of each correlator 161, 162, and 163 is coupled to the multi-user detector 103 shown in FIG. 1. Either the correlators 161, 162, and 163 and/or the multi-user detector 103 may include a sampler (not shown) that samples the correlator output over a predetermined time interval, such as the period of any information signal embedded in the signal $s_n(t)$. A decision system (not shown) may be employed to interpret or otherwise process signals output by the sampler (not shown).

Noise at a correlator's output originates from several sources:

1. Environment and circuit noise.

2. Undesired signals.

3. Desired signals having time offsets.

Noise output due to environment and circuit noise is typically negligible compared to noise due to undesired signals (such as jamming and other interference). Before synchronization, or during imperfect synchronization, a part of the desired signal is output as noise. The amount of output noise depends on the degree of synchronization. When there is no synchronization (the reference and target signals are more than one code chip apart, or they are separated by more than the inverse bandwidth of a true noise or other wideband signal), the output produced is all noise.

FIG. 7A shows signal levels and noise levels measured at the output of a correlator. A desired signal level 75A results from the correlation of the time-shifted components 72 and 81 shown in FIG. 6. A noise level 85A results from desired signal components that are not correlated, such as from mixing signal 71 with signals 81, 82, and 83, signal 72 with signals 82 and 83, and signal 73 with signals 81, 82, and 83. A noise level 95A results from undesired signals. As the noise levels (such as noise levels 85A and 95A) increase, the determination of desired signal values in a measurement comprising a superposition of noise and desired signal values becomes uncertain.

The ratio of the desired signal level 75A (correlated desired signal components) to the noise level 85A resulting from uncorrelated desired signal components depends on the delay $\Delta t_i$ applied to the signal components shown in FIG. 6. For example, the signal levels shown in FIG. 7A may correspond to noise and desired signal levels when the second sample is time-shifted by an amount of $\Delta t_1$ so that component 72 lines up with component 81. FIG. 7B shows different signal and noise levels that occur when the second sample is time-shifted by an amount of $\Delta t_3$, which causes component 73 to line up with component 81.

Two algebraically unique equations of a desired signal's level (represented by 75A and 75B) and uncorrelated desired signal components (represented by 85A and 85B) may be adequate to substantially separate uncorrelated desired signal components from the desired signal's level. A third correlation process using a different relative delay $\Delta t_i$ between samples may provide a third algebraically unique equation, which could be useful in removing noise due to cross correlations of undesired signals.

Interference at a correlator's output originates from several sources:

1. Other correlations of multipath components of the desired signal.

2. Correlations of undesired signals.

The desired signal may have multiple correlations for a given relative delay $\Delta t_i$. Interference due to time-shifted versions of the desired signal can cause distortion and intersymbol interference of the desired correlation. Multiple correlations of signals having different delays $\Delta t_i$ can provide algebraically unique combinations of interfering signals. Thus, a multi-user detector (such as the multi-user detector 103 shown in FIG. 1) can separate interfering signals by various techniques including cancellation and constellation methods.

FIG. 8 illustrates the operation of a three-input weight-and-sum canceller 103 used for multi-user detection. Three inputs 201, 202, and 203 receive signals $y_1(t)$, $y_2(t)$, and $y_3(t)$ that have transmit components $s_1(t)$, $s_2(t)$, and $s_3(t)$ from three correlator outputs, such as the correlators 161, 162, and 163 shown in FIG. 1.

$$y_1(t) = \beta_{11} s_1(t) + \beta_{12} s_2(t) + \beta_{13} s_3(t) + n_1$$

$$y_2(t) = \beta_{21} s_1(t) + \beta_{22} s_2(t) + \beta_{23} s_3(t) + n_2$$

$$y_3(t) = \beta_{31} s_1(t) + \beta_{32} s_2(t) + \beta_{33} s_3(t) + n_3$$

where $n_1$, $n_2$, and $n_3$ are noise signals and $\beta_{mn}$ are complex proportionality terms similar to spatial gain terms described in U.S. Pat. No. 6,008,760, which is hereby incorporated by reference.

The proportions of the proportionality terms $\beta_{mn}$ of the components $s_n(t)$ must differ such that the equations for $y_m(t)$ are unique for all m. For m=1, 2, 3, this provides three equations with three unknowns. Each solution of the three equations provides an estimate of one of the signal components $s_1(t)$, $s_2(t)$, and $s_3(t)$ at an output 251, 252, and 253.

Each input signal $y_m(t)$ is sampled twice or split into two samples. One of the $y_1(t)$ samples goes through a first weighting process 211 where the signal $y_1(t)$ remains unchanged. The weighting processes are illustrated as amplifiers to indicate that a buffering process occurs when signals are weighted. Signals added to the output of a buffer do not affect the value of signals input to the buffer. The signal $y_1(t)$ is then combined with a weighted version of component $y_2(t)$ that receives a weight of $-g_{12}$ from a weighting element 213. The signals $y_1(t)$ and $-g_{12}y_2(t)$ are summed to produce signal $y_{12}(t)$. The second sample of $y_1(t)$ goes through a second weighting process 212 where it is changed by gain $-g_{31}$. This weighted signal is combined with an unweighted version of signal $y_3(t)$ that is processed with unity gain 215 to produce signal $y_{31}(t)$. An unweighted version of signal $y_2(t)$ is output after a unity gain buffer 214 and is combined with a weighted version of signal $y_3(t)$ to produce signal $y_{23}(t)$. The signal $y_3(t)$ receives a weight of $-g_{23}$ from a weighting process 216.

An unweighted version of signal $y_{12}(t)$ passes through a buffering process 231 and is combined with a $-g_{41}$ weighted version of signal $y_{31}(t)$ that is acted on by a weighting process 232. The resulting signal is $y_{41}(t)$. A second version of signal $y_{12}(t)$ acquires a weight of $-g_{42}$ in a weighting process 233 before being combined with signal $y_{23}(t)$, which passes through a buffering process 234. This produces signal $y_{42}(t)$. Signal $y_{42}(t)$ passes through a buffering process 244 and is combined with a weighted version of $y_{31}(t)$ to provide an estimated signal $s'_2(t)$ at the output 252. The signal $y_{31}(t)$ has a weight of $-g_{52}$ applied by a weighting process 243. An estimated signal $s'_1(t)$ at output 251 results from the summation of signal $y_{41}(t)$ with a version of signal $y_{23}(t)$, which has a weight of $-g_{51}$ applied by a weighting process 242. The signal $y_{41}(t)$ is unchanged as it passes through a buffering process 241. The combining of unweighted signal $y_{31}(t)$ with a weighted signal $y_{42}(t)$ produces an estimated signal $s'_3(t)$ at output 253. The unweighted signal $y_{31}(t)$ is buffered by a process 246, and signal $y_{42}(t)$ is multiplied by a weight value of $-g_{53}$ during a weighting process 245.

The estimated signal values are given by the following equations:

$$s'_1(t) = (\beta_{11} - \beta_{21}g_{12} - (\beta_{31} - g_{31}\beta_{11})g_{41} - (\beta_{21} - \beta_{31}g_{23})g_{51})s_1(t) +$$
$$(\beta_{12} - \beta_{22}g_{12} - (\beta_{32} - g_{31}\beta_{12})g_{41} - (\beta_{22} - \beta_{32}g_{23})g_{51})s_2(t) +$$
$$(\beta_{13} - \beta_{23}g_{12} - (\beta_{33} - g_{31}\beta_{13})g_{41} - (\beta_{23} - \beta_{33}g_{23})g_{51})s_3(t)$$

$$s'_2(t) = ((\beta_{21} - g_{31}\beta_{31}) - (\beta_{11} - \beta_{21}g_{12})g_{42} - (\beta_{31} - \beta_{11}g_{31})g_{52})s_1(t) +$$
$$((\beta_{22} - g_{31}\beta_{32}) - (\beta_{12} - \beta_{22}g_{12})g_{42} - (\beta_{32} - \beta_{12}g_{31})g_{52})s_2(t) +$$
$$((\beta_{23} - g_{31}\beta_{33}) - (\beta_{13} - \beta_{23}g_{12})g_{42} - (\beta_{33} - \beta_{13}g_{31})g_{52})s_3(t)$$

$$s'_3(t) = (\beta_{31} - \beta_{11}g_{31} - ((\beta_{21} - g_{23}\beta_{31}) - (\beta_{21} - \beta_{31}g_{23})g_{42})g_{53})s_1(t) +$$
$$(\beta_{32} - \beta_{12}g_{31} - ((\beta_{22} - g_{23}\beta_{32}) - (\beta_{22} - \beta_{32}g_{23})g_{42})g_{53})s_2(t) +$$
$$(\beta_{33} - \beta_{13}g_{31} - ((\beta_{23} - g_{23}\beta_{33}) - (\beta_{23} - \beta_{33}g_{23})g_{42})g_{53})s_3(t)$$

If the weights $g_{ij}$ are selected to completely cancel interfering signals, the interference components $s_p(t)$ (where $p \neq k$) of each estimated signal $s'_k(t)$ are zero. In this case, all weights $g_{ij}$ are functions of proportionality terms $\beta_{mn}$. In order to minimize the sum of interference and noise contributions to the estimated signals $s'_k(t)$, it is desirable to adjust the weights $g_{ij}$ used in the spatial demultiplexer 206. Thus, a small amount of interference may be added to the signals $s'_k(t)$ in order to reduce the total noise plus interference.

Assuming that noise levels for each input signal $y_m(t)$ are the same (and defined as $n_o$), corresponding values of noise $n_k$ in the estimated signals $s'_k(t)$ are related to the absolute values of the weights used in the spatial demultiplexer 206. This is shown by the following equations:

$$n_1 = ((1 + |g_{12}|) + (1 + |g_{31}|)|g_{41}| + (1 + |g_{12}|)|g_{51}|)n_o$$

$$n_2 = ((1 + |g_{23}|) + (1 + |g_{12}|)|g_{42}| + (1 + |g_{31}|)|g_{52}|)n_o$$

$$n_3 = ((1 + |g_{31}|) + (1 + |g_{23}|) + (1 + |g_{12}|)|g_{42}|)|g_{53}|)n_o$$

A training sequence may be used to establish the values of the weights $g_{ij}$. A training sequence involves sending known reference signals such that the spatial gain characteristics of each received signal can be determined. This may be accomplished by sending a reference signal at a predetermined time or after interrogation or by sending a reference signal on a different communication channel (such as a frequency channel or a CDMA code channel). The rate of change of the proportionality terms may be determined from the reference signals and then used to adapt the weights to compensate for predicted changes in the proportionality terms. The weights may also be determined by estimation methods in addition to or in place of reference signals.

Other cancellation methods may be used in addition to or in place of the method described. One such method involves taking the inverse of the matrix $\beta_{mn}$ that describes the proportionality terms of the received signals $y_m(t)$ and then applying the inverse to the received signals $y_m(t)$. Another technique for diagonalizing the matrix $\beta_{mn}$ is known as Cramer's method. These techniques, as well as others, may be used together. Different cancellation methods often provide the best signal reception for different received spatial gain distributions.

The multi-user detector 103 can be used to remove both noise and interference. Parameters of the multi-user detector 103 may be controlled in order to optimize any signal-quality measurement, such as signal to noise, signal to interference, and signal to noise plus interference. Control of the correlators may also be provided to optimize any signal-quality parameter.

Figure 9A:
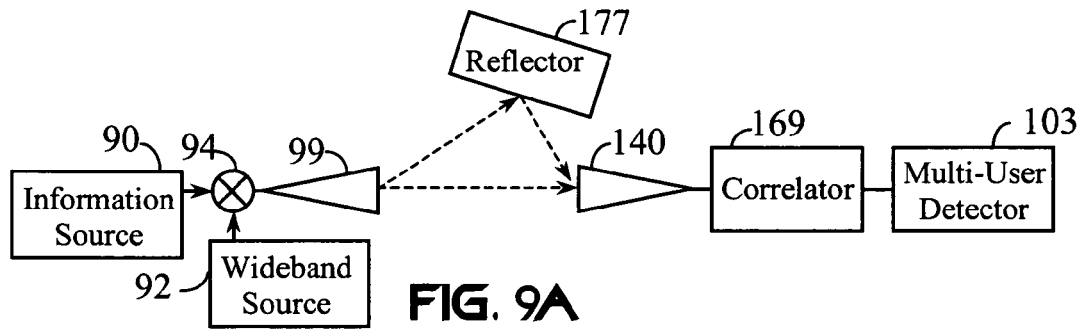
FIG. 9A shows a spread-spectrum communication system of the present invention that uses multipath to produce multiple time-offset versions of a transmitted signal.

FIG. 9A shows a spread-spectrum communication system of the present invention. A spread-spectrum transmission system includes an information-signal source 90, a wideband-signal source 92, a modulator 94, and a transmitter 99. The modulator 94 is coupled to the information-signal source 90 and the wideband-signal source 92 for modulating or otherwise coupling an information signal onto a wideband signal to provide spreading of the information signal. Modulation may also involve modulating signals onto one or more carrier signals. Modulation may be accomplished by adding the information to the spectrum-spreading code before it is used as spreading modulation. Alternatively, information may be used to modulate a carrier before spreading it. This type of modulation can be accomplished by some form of angle modulation. The wideband signal may be any type of coded or true noise signal. The spread-spectrum information signal is coupled into a communication channel by the transmitter 99.

The transmitter 99 may include signal-processing circuits (not shown), such as amplifiers (not shown) and filters (not shown).

Transmitted signals propagate through the channel and arrive at a receiver 140 after reflecting off of one or more objects, such as object 177. Thus, the receiver 140 receives a plurality of time-shifted versions of the transmitted signal. The received signals are coupled to a correlator processor 169, which may include a plurality of correlators (not shown). The correlator processor 169 splits (or otherwise duplicates) the received signals for providing a plurality of samples. The correlator processor 169 may apply at least one delay to at least one sample of the received signals prior to correlating a plurality of the samples. A multi-user detector 103 is coupled to the correlator processor 169 to remove noise and/or interference from the correlated signals.

Signals transmitted by a plurality of spread-spectrum transmission systems are separable by a receiving system of the present invention provided that the delay profiles of the transmitted signals arriving at the receiver system are unique for each associated transmission system. Such uniqueness may be ensured by spatially separating the transmission systems so each transmitted signal experiences a unique multipath environment. The transmission systems may each have a different directionality that causes the signals transmitted by each system to experience a different multipath environment. Thus, multiple transmission systems may be co-located but have different directionality to ensure separability of signals received by a receiver.

Figure 9B:
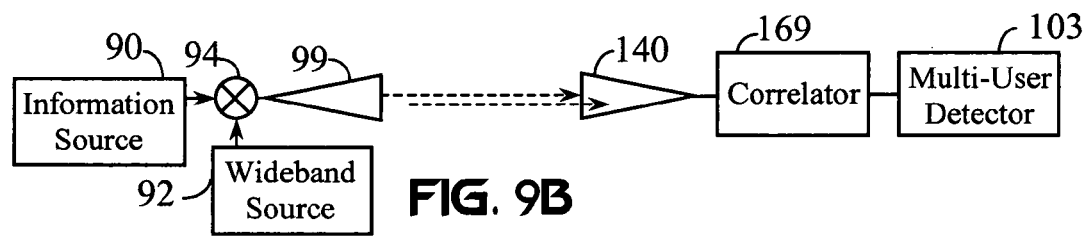
FIG. 9B shows a spread-spectrum communication system of the present invention that in which a transmitter produces multiple time-offset versions of a transmitted signal.

FIG. 9B shows a spread-spectrum communication system having similar components to the system shown in FIG. 9A. The transmitter 99 generates multiple time-offset versions of the spread information signal. Thus, multipath effects are not necessary for providing time offsets to the transmitted signals. Delay characteristics of received signals may be adjusted by the transmitter to ensure unique delay profiles and/or otherwise compensate for a multipath environment. Similarly, spatial location, transmitter directionality, and/or receiver directionality may be adjusted to compensate for a particular multipath environment and/or ensure that delay profiles of signals received by a receiver are unique.

The transmitter 99 may transmit a correlation signal or any type of despreading code that is time-offset from the transmitted spread-spectrum information signal. A correlation signal or despreading code includes any signals that may be used by a receiver to decode, decrypt, or otherwise extract an information signal from a received signal. For example, the transmitter 99 may be coupled to the wideband-signal source 92, which may input one or more wideband signals that are time offset from the spread-spectrum information signal. The transmitted wideband signal may be received and correlated with the transmitted spread-spectrum information signal to recover the information signal.

Figure 9C:
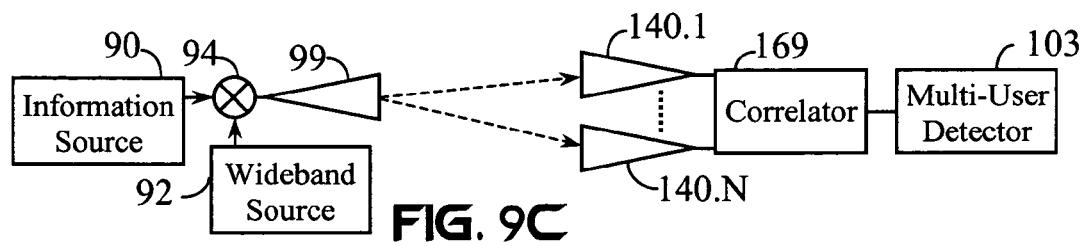
FIG. 9C shows a spread-spectrum communication system of the present invention in which a receiver array generates multiple time-offset versions of a received signal.

FIG. 9C shows a spread-spectrum communication system having an array of receivers 140.1 to 140.N coupled to the communication channel. The receivers 140.1 to 140.N may be uniformly spaced or non-uniformly spaced. Other components in the system are similar to the components shown in FIG. 9A. The array of receivers 140.1 to 140.N provide an effective multipath to received signals. The angle of arrival of the received signals determines the delay profile of the signals received by the receivers 140.1 to 140.N.

Figure 9D:
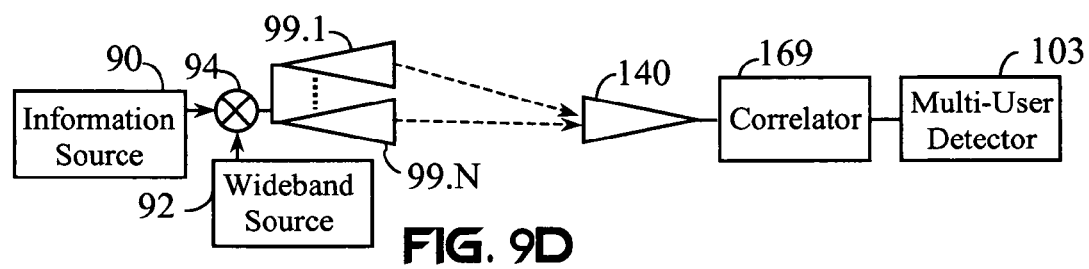
FIG. 9D shows a spread-spectrum communication system in which a transmitter array generates multiple time-offset versions of a transmitted signal.
Figure 9E:
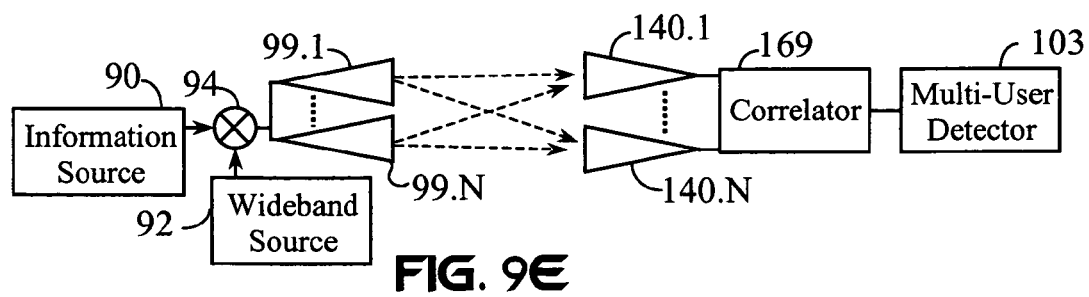
FIG. 9E shows a spread-spectrum communication system of the present invention that includes transmitter and receiver arrays.

In FIG. 9D, a plurality of transmitters 99.1 to 99.N provides an effective multipath delay profile to signals received by a single receiver 140. In FIG. 9E, an array of transmitters 99.1 to 99.N and an array of receivers 140.1 to 140.N are used to provide and/or enhance delay profiles of signals that are transmitted and received by the spread-spectrum communication system.

Figure 10A:
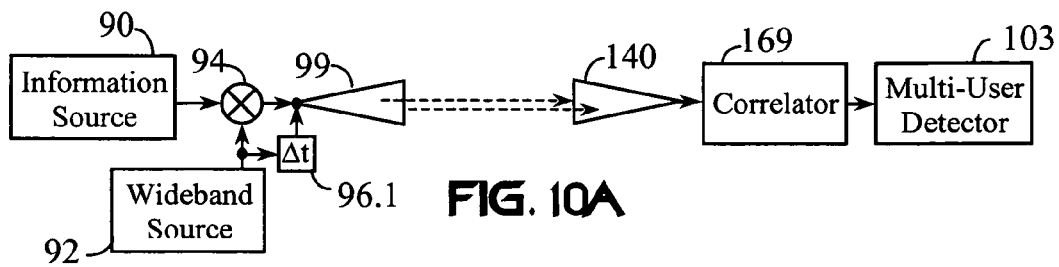
FIG. 10A shows a spread-spectrum communication system that transmits a despreading signal having a time offset from a transmitted spread-spectrum signal.

FIG. 10A shows a spread-spectrum communication system that transmits a despreading signal having a time offset $\Delta t_i$ from a transmitted spread-spectrum signal. Components shown in FIG. 10A are similar to the components listed in FIG. 9B. The modulator 94 modulates an information signal $s_n(t)$ from an information-signal source 90 onto a wideband signal generated by a wideband-signal source 92 for providing a spread-spectrum signal. The wideband signal may be any type of coded or noise signal. The wideband-signal source 92 and the modulator 94 are coupled to a transmitter 99. A wideband signal from the wideband-signal source 92 is delayed by at least one delay element, such as delay element 96.1, before being coupled into the transmitter 99. The transmitter 99 couples the spread-spectrum signal and the delayed wideband signal into a communication channel. The spread-spectrum signal may be delayed. For example, a delay element (not shown) may be coupled between the modulator 94 and the transmitter 99 instead of (or in addition to) the delay element 96.1 shown in FIG. 10A. At a receiver, at least one sample of the received transmission signal is delayed by an amount $\Delta t_i$ in a correlator processor 169. The correlator processor 169 then matches the time-offset wideband signal to a desired spread-spectrum signal and thereby reproduces the embedded information-bearing signal as an output.

In the transmission system shown in FIG. 10A, the modulation technique employed is preferably a form of phase-shift key modulation. However, any type of modulation scheme may be used, including amplitude modulation, frequency modulation, polarization modulation, code modulation, etc. In some applications, differential modulation schemes are preferable. A preferred embodiment of the invention uses a constant-modulus modulation scheme. The modulation scheme used in the transmission systems shown in FIGS. 9A to 9E is one that preferably facilitates discrimination between transmitted symbols after correlation. Thus, differential amplitude modulation is one of many candidate modulation schemes that may be used.

Figure 10B:
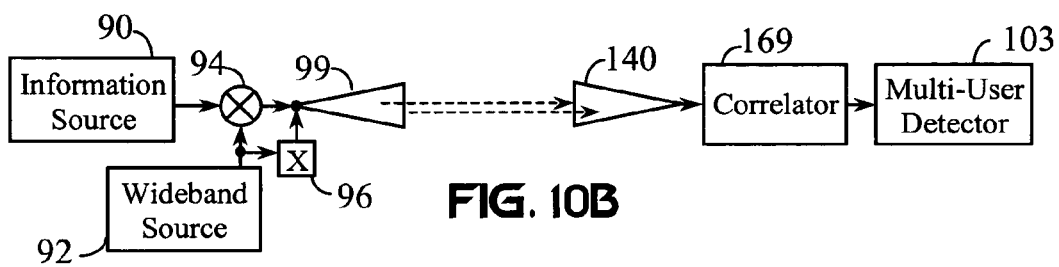
FIG. 10B shows a spread-spectrum communication system that transmits a despreading signal having a different diversity parameter from a transmitted spread-spectrum signal.

FIG. 10B illustrates a diversity transmitter of the present invention having similar elements as the transmitter shown in FIG. 10A. A diversity encoder 96 adjusts at least one diversity characteristic of a wideband signal generated by a wideband-signal source 92. Diversity characteristics include any parameter that can be used to differentiate or otherwise separate signals. Diversity characteristics include, but are not limited to, polarization, frequency, directionality, time, phase space, spatial separation, and subspace channels. In one set of preferred embodiments, one or more diversity parameters are adjusted in such a way as to not increase the frequency band of the transmission.

The diversity encoder 96 may be a delay element (such as the delay element 96.1 shown in FIG. 10A) in order to provide time diversity to the wideband signal. The transmitter 99 may include an array of transmission elements (not shown) and the diversity encoder 96 may include a coupling system (not shown) that connects the diversity encoder 96 to individual transmission elements (not shown).

Figure 10C:
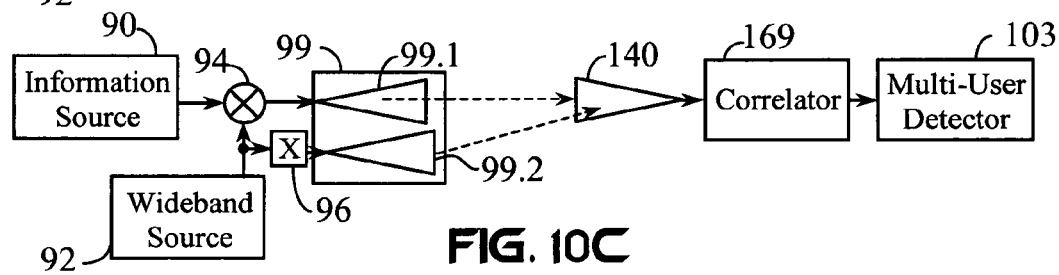
FIG. 10C shows a spread-spectrum communication system that transmits a despreading signal from a separate transmitting element.

FIG. 10C illustrates a diversity transmitter of the present invention having similar elements as the transmitter shown in FIG. 10B. The diversity encoder 96 may comprise part of a transmitter 99, particularly if the diversity encoder 96 encodes signals with respect to spatial separation, polarization, or directionality. The transmitter 99 includes a first transmission system 99.1 and a second transmission system 99.2. The diversity encoder 96 is coupled to the second transmission system 99.2.

Figure 10D:
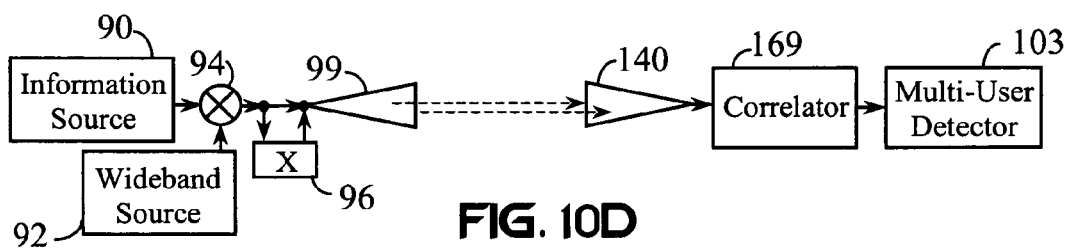
FIG. 10D shows a spread-spectrum communication system that transmits a duplicate spread-spectrum signal having at least one diversity parameter with a unique value.
Figure 10E:
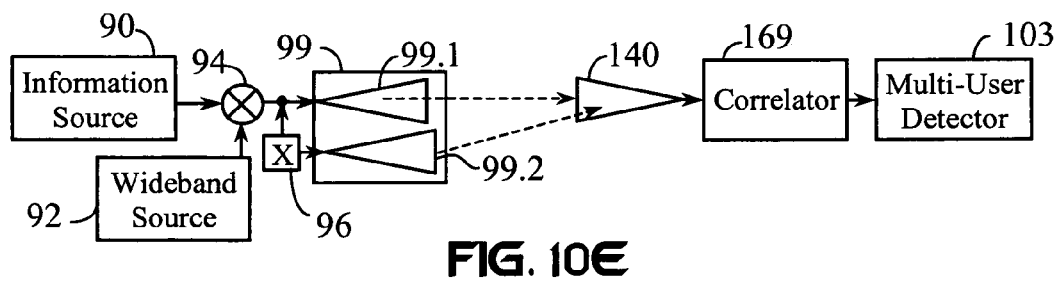
FIG. 10E shows a spread-spectrum communication system that transmits a duplicate spread-spectrum signal from a separate transmitting element. The transmitted signals may have different values of at least one diversity parameter.

FIG. 10D and FIG. 10E show diversity transmitters of the present invention in which a diversity encoder 96 encodes a spread-spectrum signal coupled out of a modulator 94. It will be appreciated that a communication channel can provide diversity encoding with respect to at least one diversity parameter. The orientation of one or more diversity transmitters may be selected to achieve one or more desirable channel-encoded diversity characteristics.

FIG. 11 shows a receiver that correlates a plurality of received signals and separates multi-user interference and/or noise from the correlation signals. A correlator processor 169 has a plurality of inputs 160.1 to 160.N coupled to a plurality of correlators 169.1 to 169.N. Correlator 169.1 includes at least one diversity processor, such as diversity processors 164.1 to 164.K. The diversity processors 164.1 to 164.K are coupled to a signal combiner 168.1 that correlates or otherwise combines a plurality of input signals. Similarly, Correlator 169.N includes at least one diversity processor, such as diversity processors 164.L to 164.M. The diversity processors 164.L to 164.M are coupled to a signal combiner 168.N that correlates or otherwise combines a plurality of input signals. The correlator processor 169 is coupled to a multi-user detector 103.

In this case, the multi-user detector 103 is shown as a two-input weight-and-sum canceller. A first input signal is split or otherwise duplicated to provide two samples that are each weighted by a weighting system 211 and 213. A second input signal is split or otherwise duplicated to provide two samples that are each weighted by a weighting system 212 and 214. A first weighted sample of the first input signal is combined with a first weighted sample of the second input signal in a first combining system 424. A second weighted sample of the first input signal is combined with a second weighted sample of the second input signal in a second combining system 426. The combining systems 424 and 426 are adapted to output signals that are substantially free from multi-user interference.

FIG. 12A shows a correlator 169.1 that is one possible embodiment of any of the correlators shown in FIG. 11. The correlator 169.1 includes at least one diversity processor, such as diversity processors 164.1 to 164.K. The diversity processors 164.1 to 164.K process input signals to create a signal output characterized by at least one particular diversity parameter.

A diversity parameter may be any type of physical or logical signal characteristic that enables multiple access and/or multi-user detection. For example, the diversity parameter exploited by the processors 164.1 to 164.K may be time, in which case the diversity processors 164.1 to 164.K apply a time delay to an input signal. Other diversity parameters may be exploited instead of (or in addition to) time including, but not limited to, frequency, polarization, directionality, spatial separation, and phase space. It will be appreciated that a diversity processor (such as the processors 164.1 to 164.K) may include receiving elements (not shown). A diversity processor (such as any of the processors 164.1 to 164.K) may provide a pass through without adjusting the diversity properties of an input signal.

FIG. 12B shows another design for a correlator 169.1 that includes a plurality of signal-input terminals 160.1 to 160.K. Correlators, as well as diversity processors, may be nested to increase the number of unique combinations of unknown signals (as well as interference and noise). Different types of diversity processors may also be used in combination. One function of the diversity processors 164.1 to 164.K is to provide a plurality of unique proportions of interfering signals (and even noise) at the correlator outputs. This enables a multi-user detector to remove interference, to remove noise, and/or to separate desired signals.

FIG. 13 shows a spread-spectrum receiver of the present invention. A receiver 140 receives a plurality of spread-spectrum signals from a communication channel. The receiver 140 may include a receiver array (not shown). The receiver 140 is coupled to a correlator processor 169 that includes a diversity-processing system 164 (such as a weighting system) including one or more diversity processors 164.1 to 164.L. The diversity-processing system 164 is coupled to a signal combiner 168 that combines a plurality of processed output signals. The signal combiner 168 may include multiple combining systems (not shown) that combine pairs of processed output signals and/or more than two output signals at a time. The multiple combining systems (not shown) may be nested. The signal combiner 168 may include one or more correlators (not shown). Output signals from a plurality of outputs 171.1 to 171.N of the correlator processor 169 may be processed in a multi-user detector (not shown).

The diversity processors 164.1 to 164.L may share a single receiver system (not shown) in the receiver 140, or the receiver 140 may include multiple receiving elements (not shown) and/or systems (not shown) that are used exclusively by each of the diversity processors 164.1 to 164.L. A diversity processor, such as processors 164.1 to 164.L, may comprise a receiving system (not shown) of the receiver 140. For example, a diversity processor may include a polarized receiver (not shown), a spatially separated receiver (not shown), a feed to a dish antenna (not shown), one or more detectors in a lens system (not shown), and/or an array-processing system (not shown). A diversity processor, such as processors 164.1 to 164.L, may include at least one polarizer (not shown), filter (not shown), delay device (not shown), phase-shifter (not shown), and/or spread-spectrum decoder (not shown).

FIG. 14A outlines steps of a transmission method of the present invention. A wideband signal is produced in a signal-generation step 170. The wideband signal may be any type of coded or true-noise signal. Information is coupled into the wideband signal in a coupling step 172. An information signal may be modulated onto the wideband signal or the information signal may be used to generate the wideband signal to produce a spread-spectrum signal. A duplicating step 174 creates at least one replica of the spread-spectrum signal. For example, the spread-spectrum signal may be split into a plurality of spread-spectrum signals having similar signal characteristics. A diversity-encoding step 176 provides adjustment of at least one diversity parameter of at least one of the spread-spectrum signals.

FIG. 14B shows steps of a transmission method of the invention. A plurality of wideband signals is generated in a signal-generation step 171. The wideband signals may include any type of coded or true-noise signals. Information is coupled into at least one of the wideband signals in a coupling step 172 to provide at least one spread-spectrum signal. A diversity-encoding step 176 provides adjustment of at least one diversity parameter of at least one of the spread-spectrum signals and/or at least one of the wideband signals.

FIG. 14C shows transmission-signal processing steps that may follow the transmission methods shown in FIG. 14A and FIG. 14B. Spread-spectrum and/or wideband signals may be modulated onto at least one carrier signal in a modulation step 178. Spread-spectrum and/or wideband signals may be coupled into a communication channel in a channel-coupling step 180.

FIG. 15A shows steps of a reception method of the invention. A plurality of duplicate spread-spectrum signals is received in a reception step 181. At least one of the received duplicate signals has been diversity-encoded by the communication channel and/or a transmitter (not shown) that generated the signal and coupled it into the channel. A diversity-decoding step 182 decodes at least one of the received diversity-encoded signals to provide at least two signals that are highly correlated. The signals are correlated in a correlation step 184 to provide a correlation output signal that is indicative of at least one information signal modulated on the received spread-spectrum signals.

FIG. 15B shows steps of a reception method of the invention. At least one spread-spectrum signal and at least one despreading signal are received in a reception step 181. A despreading signal is any signal that may be correlated or otherwise combined with a spread-spectrum signal to recover a spread information signal. At least one of the received spread-spectrum and/or despreading signals has been diversity-encoded by the communication channel and/or a transmitter (not shown) that generated the signal and coupled it into the channel. A diversity-decoding step 183 decodes at least one of the received diversity-encoded signals to provide at least two signals that are highly correlated. The signals are correlated in a correlation step 184 to provide a correlation output signal that is indicative of at least one information signal modulated on the received spread-spectrum signals.

Although the drawings and specification imply simple in-line correlation, heterodyne correlation may also be used. A heterodyne correlator produces a correlated signal output at a different center frequency than the input signal. In the process of despreading or removing the code modulation (or noise), the information-bearing signal is translated to a new center frequency. This avoids the possibility of direct feedthrough and, in some instances, simplifies receiver design because the circuitry following a heterodyne correlator can operate at a lower frequency. Correlators described herein and shown in the figures may sample, sum, sample and sum, multiply, or otherwise combine two or more signal inputs over at least one time interval.

In the preferred embodiments, several kinds of interferometry multiplexing are demonstrated to provide a basic understanding of diversity reception and spatial demultiplexing. With respect to this understanding, many aspects of this invention may vary. Multi-user detectors illustrated and described herein have been of the cancellation type. However, other types of multi-user detection systems (such as constellation processors) may be used, as described in U.S. Pat. No. 6,008,760, U.S. Pat. No. 6,211,671, PCT Appl. No. WO95/03686, U.S. Prov. Pat. Appl. 60/163,141, and U.S. patent application Ser. Nos. 08/862,859, 09/324,206, and 09/347,182, which are all incorporated by reference. Multi-user detection may be performed with respect to any type of optimization technique, such as, but not limited to maximal combining. The invention described herein may be integrated with any of the diversity-processing methods described in U.S. Prov. Pat. Appl. 60/163,141.

The communication channel may be a free-space channel or any type of guided-wave channel. The invention described herein is applicable to optical-fiber communications.

A CPU may be used to perform constellation processing, weight-and-sum operations, or equivalent types of cancellation processes associated with multi-user detection. Similarly, correlation and other signal-combining processes may be performed by digital signal processing methods.

Although the wireless interface in the invention is described with regard to RF and microwave frequencies, the principles of operation of the invention apply to any frequency in the electromagnetic spectrum. Additionally, diversity processing (such as encoding and decoding) may include combinations of space, frequency, time, phase-space, mode, code, and polarization-diversity processing methods. In this regard, it should be understood that such variations, as well as other variations, fall within the scope of the present invention, its essence lying more fundamentally with the design realizations and discoveries achieved than merely the particular designs developed.

The foregoing discussion and the claims that follow describe the preferred embodiments of the present invention. With respect to the claims, it should be understood that changes could be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

I claim:

1. A method comprising:
   generating a spread information signal,
   generating a despreading signal,
   diversity-encoding at least one of the spread information signal and the despreading signal, and
   transmitting diversity-encoded spread-spectrum signals by coupling the spread information signal and the despreading signal into a wireless communication channel, wherein the despreading signal is transmitted distinctly from the spread information signal.

2. The method of claim 1 wherein the despreading signal comprises a noise signal.

3. The method of claim 1, further comprising duplicating the spread information signal.

4. The method of claim 1 wherein diversity encoded spread-spectrum signals recited in claim 1 wherein diversity-encoding includes at least one item of a set comprising providing a time offset, polarizing, applying a predetermined directionality, transmitting from a plurality of spatially separated transmitters, modulating with a predetermined carrier frequency, combining with a carrier having a predetermined mode, and transmitting signal in at least one predetermined subspace channel.

5. The method of claim 1, further comprising a step of modulating the spread information signal or the despreading signal onto a carrier signal.

6. A method comprising:
   generating an information-bearing wideband signal,
   generating a decoding signal,
   diversity-encoding at least one of the information-bearing wideband signal and the decoding signal, and
   transmitting diversity-encoded spread-spectrum signals by coupling the information-bearing wideband signal and the decoding signal into a wireless communication channel, wherein the decoding signal is transmitted distinctly from the information-bearing wideband signal.

7. The method of claim 6 wherein the information-bearing wideband signal includes a noise signal.

8. The method of claim 6 wherein the step of diversity-encoding includes at least one item of a set including providing a time offset, polarizing, applying a predetermined directionality, transmitting from a plurality of spatially separated transmitters, modulating with a predetermined carrier frequency, combining with a carrier having a predetermined mode, and transmitting the signals in at least one predetermined subspace channel.

9. The method of claim 6, further comprising a step of modulating the information-bearing wideband signal or the decoding signal onto a carrier signal.

10. A spread-spectrum transmitter comprising:
- a wideband-signal generator to generate a plurality of wideband signals, at least one of the plurality of wideband signals being a despreading signal,
- a modulator coupled to the wideband signal generator to modulate at least one information signal onto at least one of the plurality of wideband signals to generate a spread information signal,
- a diversity processor to adjust at least one diversity parameter of at least one of the spread information signal and the despreading signal, and
- a transmitter to transmit diversity-encoded spread-spectrum signals by coupling the spread information signal and the despreading signal into a wireless communication channel, wherein the despreading signal is to be transmitted distinctly from the spread information signal.

11. A spread-spectrum transmitter comprising:
- a wideband-signal generator to generate a plurality of wideband signals, at least one of the plurality of wideband signals being a decoding signal,
- a modulator coupled to the wideband signal generator to modulate information onto at least one of the plurality of wideband signals to generate an information-bearing wideband signal,
- a diversity processor to adjust at least one diversity parameter of at least one of the information-bearing wideband signal and the decoding signal, and
- a transmitter to transmit diversity-encoded spread-spectrum signals by coupling the spread information-bearing wideband signal and the decoding signal into a wireless communication channel, wherein the decoding signal is to be transmitted distinctly from the information-bearing wideband signal.

* * * * *